METHOD OF MANUFACTURING CRYSTALLINE MATERIAL

Filed Nov. 30, 1955

ROBERT G. POHL
*INVENTOR.*

BY John J. Pederson
HIS ATTORNEY.

United States Patent Office 2,835,614

Patented May 20, 1958

2,835,614

METHOD OF MANUFACTURING CRYSTALLINE MATERIAL

Robert G. Pohl, Chicago, Ill., assignor to The Rauland Corporation, a corporation of Illinois Application November 30, 1955, Serial No. 550,061

1 Claim. (Cl. 148—1.5)

This invention relates to a new and improved method of manufacturing crystal semi-conductor material suitable for use in devices such as crystal diodes, transistors, and similar apparatus. More specifically, the method of the invention is directed to a process for producing semi-conductor crystals of substantial length having essentially constant impurity content throughout their length.

In the manufacture of many semi-conductor devices, it is desirable to obtain single crystals of semi-conductor material which exhibit essentially constant electrical properties throughout their lengths. Inasmuch as the critical electrical properties, such as conductivity, are a function of the impurities present in the semi-conductor crystal, this makes fabrication of single crystals having an essentially uniform impurity content highly desirable. The usual semi-conductor material are germanium and silicon, and the impurities in question comprise acceptor modifiers such as gallium, indium, and boron from the third group of the periodic table and donor elements such as arsenic and antimony from the fifth group of the periodic table.

In processing germanium or silicon for use in semi-conductor crystal devices, it is usually necessary to melt and recrystallize the semi-conductor in order to reduce its impurity content. In one process of this type, sometimes referred to as the Czochralski process, the semi-conductor material is melted completely, after which a seed crystal is brought into contact with the melt and slowly withdrawn, forming a single crystal by continuing accretion to the seed. In other processes, recrystallization from a melted mass of germanium is initiated without using a seed crystal. In all of these known refining methods, the concentration of impurities in the recrystallized material tends to increase with continuing crystallization; as a consequence, the recrystallized material does not exhibit the desired uniform electrical characteristics. According to one proposal, this non-uniform impurity problem may be substantially eased by progressively decreasing the rate of crystal growth. This process, however, offers some substantial disadvantages. It tends to produce crystals of non-uniform cross-section (crystal diameter tends to increase with decreases in rate of crystal growth) and is also objectionable in that it requires continual variation of the critical temperature and crystal growth-rate factors in the process.

It is a principal object of the invention, therefore, to provide a new and improved method of manufacturing crystalline semi-conductor material which permits formation of crystals of uniform impurity content without requiring substantial variation in the rate of crystal growth.

It is another object of the invention to provide a new and improved method of manufacturing germanium oı silicon crystals having substantially uniform impurity concentration without requiring substantial variation in the temperature of the molten material from which the crystals are formed.

It is a further object of the invention to provide a new and improved process for manufacturing crystalline semi-conductor material which is susceptible of accurate control in maintaining essentially uniform impurity concentration throughout the crystalline material.

In accordance with the invention, the method of manufacturing crystalline semi-conductor material comprises the following steps: A mass comprising a semi-conductor material to be crystallized (preferably silicon or germanium) and a minute quantity of impurities is heated to liquefy at least a part of the mass. A fractional portion of the liquefied mass is cooled to initiate crystallization of the semi-conductor material. Additional increments of the liquefied mass at the interface between the already-crystallized portion and the liquefied mass are progressively cooled to crystallize the liquefied semi-conductor material by continuing accretion to the crystallized portion. During this crystallization process, the liquefied mass in the region adjacent the interface is progressively increasingly agitated to maintain the impurity content in the crystallized semi-conductor material substantially constant throughout the length of the crystal produced.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1:
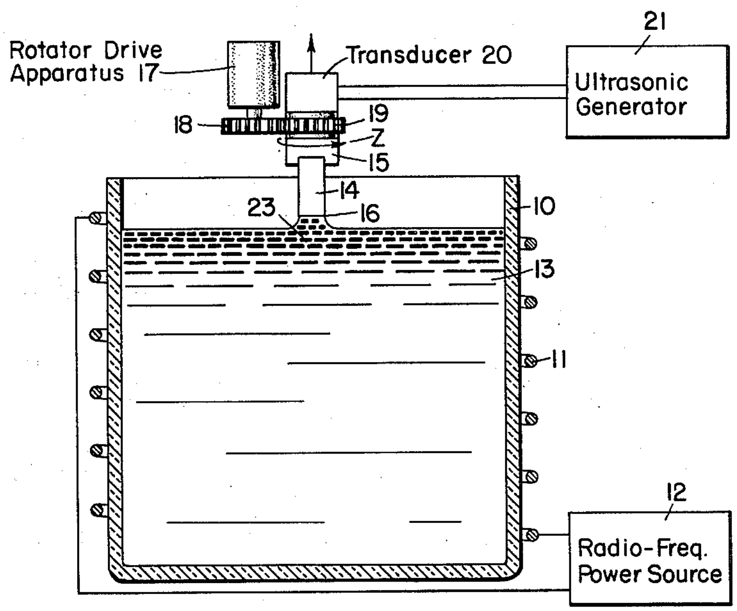
Figure 1 is a cross-sectional view, partly schematic, of a portion of one type of apparatus suitable for use in conjunction with the inventive process.

The apparatus illustrated in Figure 1 is of conventional form and corresponds generally to equipment employed to manufacture semi-conductor crystals and other types of crystalline metallic material. The apparatus comprises a crucible 10 which may be constructed from quartz, graphite, or other suitable material. An inductive heating coil 11 is positioned in encompassing relation to crucible 10 and is connected to a radio-frequency power source 12.

In conventional practice, crystalline semi-conductor material is formed by first placing in the crucible a mass comprising a semi-conductor element, such as silicon or germanium, and at least one type of modifier impurity. The impurity may be of the donor type, which comprises elements from the fifth group of the periodic table, or may be of the acceptor type from group three of the table. Other impurities, such as lead may be present in minor quantities. Radio-frequency energy is then applied to coil 11 from source 12 so that the semi-conductor and the modifier impurity are induction-heated to form a melt 13. Preferably, the frequency of the electrical power supplied to coil 11 is high enough to avoid any appreciable agitation of melt 13.

A seed crystal 14, formed from the same semi-conductor element as the melt and of suitable size and crystal orientation, is then brought into contact with melt 13 and is subsequently withdrawn from the melt at a relatively slow speed as indicated by arrow Y. Seed crystal 14 may be held in a suitable clamp or receptacle 15, preferably formed from a material having a high thermal conductivity. As the seed crystal is withdrawn from the melt, material from the melt tends to adhere to the seed crystal because of surface tension and to crystallize as a continuation of crystal 14. The rate of withdrawal of the seed crystal and the rate of formation of crystallized material are maintained quite low (preferably ten inches per hour or less), and the temperature of the liquid-solid interface 16 between the crystallized material and melt 13 is maintained approximately at the recrystallization temperature of the semi-conductor element so that a long continuous crystal is formed by continuing accretion to crystal 14.

Because there are several different mechanisms available for immersing and withdrawing seed crystal 14 from melt 13, no specific example of this apparatus has been illustrated in the drawings. Either mechanical- or electrical-drive systems may, of course, be employed. Moreover, it will be understood that the entire process should be carried out in a vacuum or in an atmosphere comprising a gas or gases which cannot react with the semi-conductor; a hydrogen or inert gas atmosphere has been found suitable for this purpose where germanium comprises the semi-conductor. It may be necessary to provide means for cooling the material at interface 16; jets of hydrogen or argon have sometimes been employed for this purpose.

In order to assure substantially uniform crystal growth, it is usually preferable to rotate the crystal about an axis coincident with its direction of withdrawal during the recrystallization process. For this purpose, apparatus may be provided to rotate crystal holder 15 in the direction indicated by arrow Z; this apparatus is illustrated schematically as a rotator drive apparatus 17 which is coupled to crystal holder 15 by means of a pinion gear 18 which drives a spur gear 19 affixed to the crystal holder.

The method of the present invention utilizes the general technique described above in connection with the apparatus of Figure 1 to produce semi-conductive crystals having essentially uniform conductivity throughout their lengths without requiring any substantial variations in the melt temperature at interface 16 or in the rate of withdrawal in the direction of arrow Y. This effect is achieved by progressively increasingly agitating the portion of melt 13 adjacent interface 16 during recrystallization. The requisite agitation may be achieved by either of two means; in one specific process, the melt adjacent the interface is agitated at an increasing rate by continuously increasing the angular velocity of crystal holder 15 and seed crystal 14 as the solidification process continues. Preferably, however, the melt material adjacent interface 16 is subjected to vibratory motion of relatively small amplitude in a direction substantially parallel to the direction Y of withdrawal. For this purpose, a suitable transducer 20 may be mechanically connected to crystal holder 15 and electrically coupled to a signal generator 21. When transducer 20 is employed to agitate the melt in the region adjacent interface 16 by vibrating crystal holder 15, the rate of melt agitation is continuously increased during the crystallization process, by increasing the frequency of the driving signal from generator 21 or by increasing the amplitude of vibration within a limited range.

Figure 2:
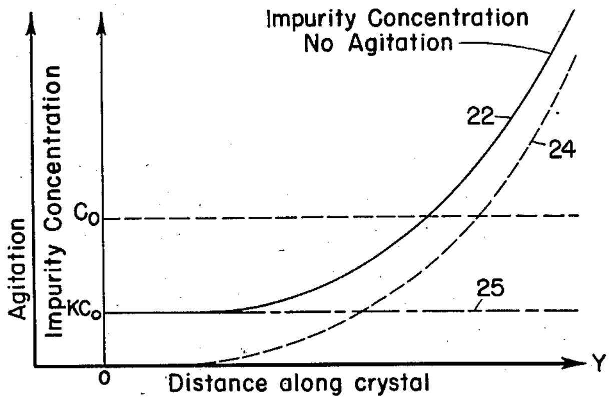
Figure 2 is an explanatory diagram showing changes in impurity concentration within the crystallized semi-conductive material under particular processing conditions.

The process of the invention may best be understood by reference to Figure 2, in which impurity concentration in a crystal formed from a germanium melt is plotted as a function of distance along the crystal. In a given melt, the initial concentration of the critical impurity in the melt may be as indicated at point $C_0$ on the graph. When crystallization is initiated, the impurity concentration in the initial portion of the crystal is substantially less than the concentration in the melt, being determined by the segregation factor $k$ of the particular impurity in the semi-conductor. Thus, the initial impurity concentration may be as indicated at point $KC_0$ on the graph. The segregation factors for different impurities in silicon and germanium may vary substantially; for example, the segregation factor for the donor modifier antimony in a germanium melt is of the order of 0.005, whereas the segregation factor for the acceptor modifier gallium in the same semi-conductor is much larger and may be of the order of 0.1. These segregation factors are generally referred to in the literature as segregation constants and are at least partially dependent upon the rate of crystal growth.

After crystal growth has been initiated, if crystallization is continued at a constant rate, the impurity concentration in the crystallized semi-conductor material increases exponentially as indicated by solid line 22 in Figure 2. The change in relative concentrations in the crystal is explained by the fact that as material from the melt is crystallized, most of the impurities are rejected from the crystal lattice and remain in the melt. These rejected impurities do not diffuse into the melt as rapidly as they are rejected; rather, they tend to accumulate in the portion 23 of the melt immediately adjacent liquid solid interface 16 (Figure 1). This phenomenon is described and analyzed in considerable detail in the paper "Solute Redistribution by Recrystallization," by R. G. Pohl, "Journal of Applied Physics," published September 1954, pages 1170–1178. Curve 22 may vary substantially in configuration, depending upon the amount of material included in the melt and the size of the crystal grown; the particular curve shown in Figure 2 is characteristic of a relatively small melt, most of which is crystallized into a single crystal.

In order to obtain relatively uniform impurity concentration throughout the length of the crystal, region 23 of melt 13 adjacent interface 16 (Figure 1) is agitated as set forth above. Moreover, the agitation must be increased as crystallization continues in order to effectively counteract the build-up of impurities in region 23 which would otherwise occur. This increase in agitation with continuing crystal growth is indicated by dash line 24 in Figure 2; with this change in conditions, the impurity concentration in the crystal remains substantially uniform throughout its length as shown by dash line 25. The requisite variations in agitation necessary for formation of a crystal in accordance with the invention may be accomplished by increasing the speed of rotation of the crystal or by varying the frequency and/or amplitude of vibratory movement imparted to the crystal from a separate vibrating apparatus such as transducer 20 and generator 21.

Where vibratory movement of the crystal is employed, it is preferred that the frequency of vibratory be relatively rapid; preferably, ultra-sonic frequencies are employed in order to obtain the advantages of cavitation phenomena in the liquid. Transducer 20 may be entirely conventional in form; for example, the transducer may comprise a piezo-electric crystal or magnetostrictive device. Generator 21, on the other hand, may comprise any of the many known types of oscillator capable of providing substantial power at ultra-sonic frequencies. Where the requisite increase in agitation is to be achieved by varying the frequency of vibration, it is a simple matter to effect this change by tuning the resonant circuit of the oscillator comprising generator 21. Amplitude changes may of course be effected by a simple potentiometer or similar device in the output stage or any intermediate stage of the generator.

Figure 3:
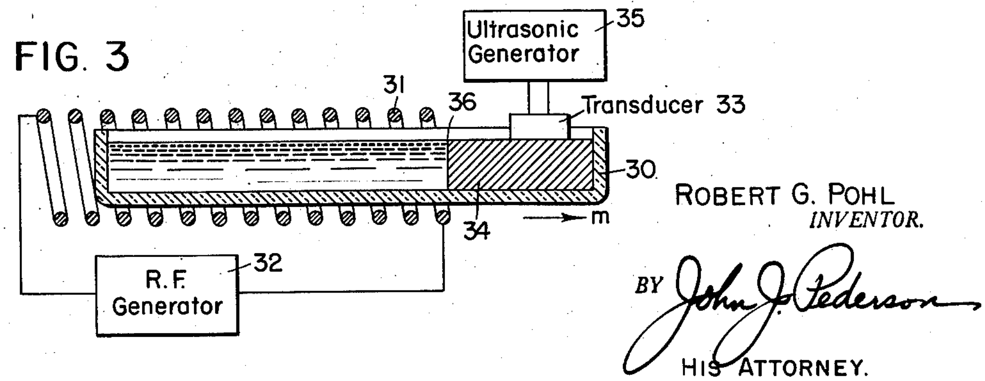
Figure 3 is a cross-sectional view, partly schematic, of a portion of another type of apparatus which may be used in conjunction with the inventive process.

Figure 3 illustrates another apparatus which may be utilized to manufacture semi-conductor crystals in accordance with the invention; this apparatus comprises a receptacle or boat 30 of quartz or other material which will not react with the semi-conductor being processed. At the start of the process, boat 30 is positioned within an induction heating coil 31 energized from a radio-frequency power source 32. A charge of semi-conductive material such as germanium along with minute quantities of impurities is placed in boat 30 and inductively heated until liquefied. Boat 30 is then moved in a direction indicated by arrow M in relation to coil 31 and a portion of the melt is permitted to cool and crystallize.

After crystallization has been initiated, a transducer is placed in contact with the recrystallized portion 34 of the semi-conductor material. Device 33 may comprise an electromechanical transducer similar to transducer 20 of Figure 1 and is energized from a suitable source of ultrasonic-frequency electrical energy indicated schematically in the drawing as generator 35. In this embodiment of the invention, as in that described above, uniformity in the impurity content of the crystallized material is achieved by increasing agitation of the melt in the region adjacent the liquid-solid interface 36 with continuing crystallization. The overall effect is essentially similar to that described above in connection with Figures 1 and 2.

At present, there is no theoretical method of determining the precise amount of variation in movement of the crystal necessary to achieve sufficient agitation of the melt in the region adjacent the liquid-solid interface to obtain uniform impurity concentration in the crystal. Rather, this must be determined empirically for a given melt constituency. Two or three trial runs should be sufficient in any given instance to determine the variations in frequency and/or amplitude of vibration necessary to achieve the full advantages of the invention.

While particular embodiments of the present invention have been described, it is apparent that changes and modifications may be made without departing from the invention in its broader aspects. The aim of the appended claim, therefore, is to cover all such changes and modifications as fall within the true spirit and scope of the invention.

I claim:

The method of manufacturing ingot lengths of crystalline semi-conductor material having substantially uniform distribution, in the direction of ingot length, of a desired impurity, and without requiring controlled variation in the temperature pattern and rate of crystal growth, comprising: heating a mass of the semi-conductor material containing a minute quantity of the impurity, to liquefy at least a part of said mass; cooling a fractional portion only of said liquefied part to initiate crystallization of said material; progressively cooling additional increments of said liquefied part at the interface between the crystallized and liquefied material to progressively crystallize additional of said material by continuing accretion to the crystallized material; continuously cavitating the liquefied part of said mass in the region adjacent said interface by applying thereto cyclic ultrasonic pressure waves; and progressively increasing the intensity of such cavitation, during the continued crystallization of the material, at such a rate as to maintain the impurity content of the crystallized material substantially constant throughout its length, without alteration of the temperature pattern and rate of crystal growth.

References Cited in the file of this patent

UNITED STATES PATENTS

| | | |
|---|---|---|
| 2,727,839 | Sparks | Dec. 20, 1955 |
| 2,739,088 | Pfann | Mar. 20, 1956 |
| 2,768,914 | Buehler et al. | Oct. 30, 1956 |

FOREIGN PATENTS

| | | |
|---|---|---|
| 1,087,946 | France | Sept. 1, 1954 |
| 1,029,684 | France | Mar. 30, 1955 |
| | (Addition to No. 63,229) | |